April 27, 1954  F. D. MAY  2,676,386
CUTOFF TOOL ASSEMBLY
Filed Dec. 21, 1948  2 Sheets-Sheet 1
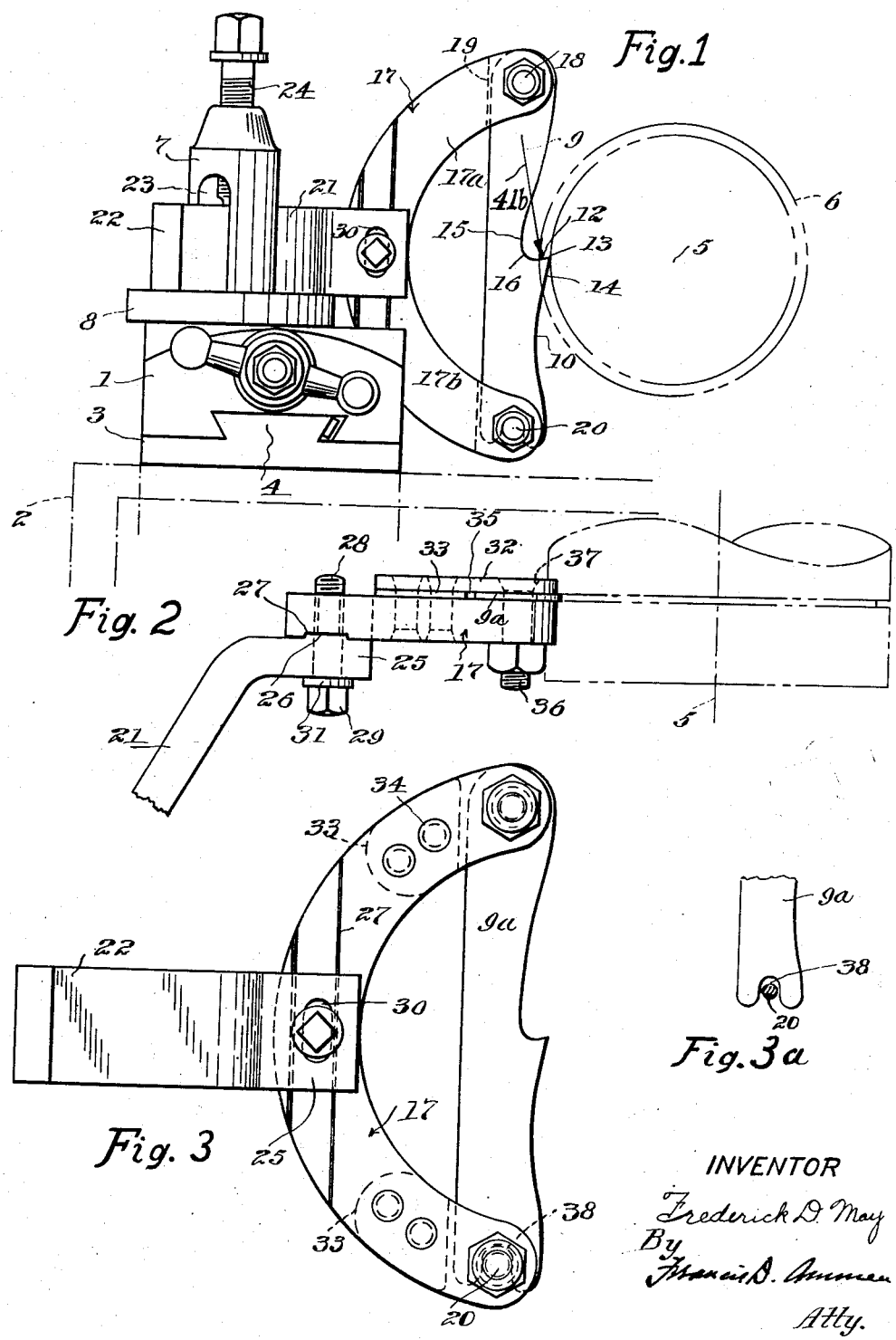
INVENTOR
Frederick D. May
By
Francis D. Ammen
Atty.

April 27, 1954
F. D. MAY
2,676,386
CUTOFF TOOL ASSEMBLY
Filed Dec. 21, 1948
2 Sheets-Sheet 2
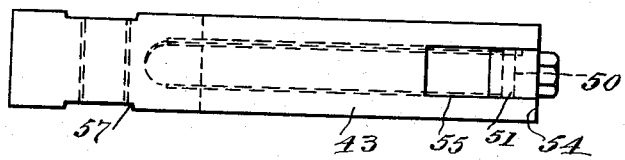
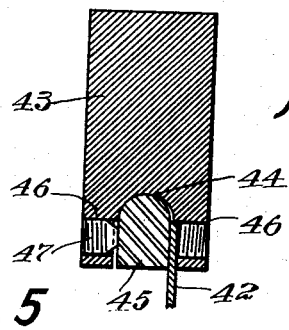
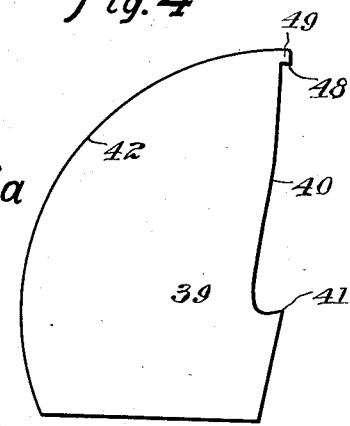
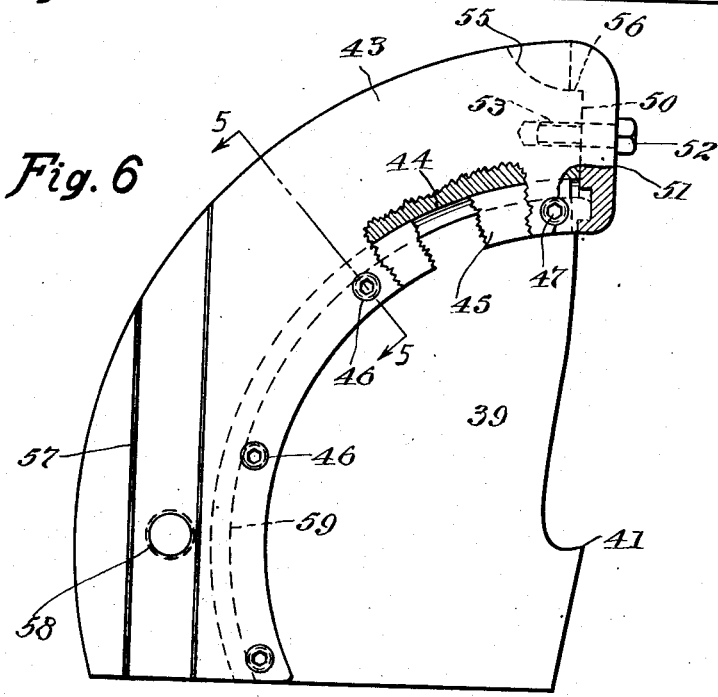
INVENTOR
Frederick D. May
By Francis D. Ammen
Atty.

Patented Apr. 27, 1954

2,676,386

UNITED STATES PATENT OFFICE 2,676,386

CUTOFF TOOL ASSEMBLY

Frederick D. May, Santa Monica, Calif.

Application December 21, 1948, Serial No. 66,436

7 Claims. (Cl. 29—96)

This invention relates to a cut-off tool assembly. Such tools are employed in machine shops and industries usually to cut off or sever round bars or rods, although they may be employed on a work-piece having any kind of cross-section where a part has to be cut off.

When a piece of work is of considerable dimension in cross-section, there must be considerable distance from the cutting point of the tool to the tool post where the cutting tool is supported when the cut is being completed at the center or axis of the work. At their cutting points these tools must have a considerable reach from the extreme tip of the tool, that is slightly in excess of the radius of the bar or rod that is to be cut off with the tool. For this reason the thickness of this cutting edge must be considerable in order to enable the tool to resist the forces exerted upon it when the tool is cutting through the material; and of course as the cutting tip wears away the tool must be occasionally sharpened and re-dressed. By reason of the fact that such a cut-off tool must have considerable thickness, of course there is a considerable loss of metal in the cut, and furthermore, the energy required in the cutting off operation is increased proportionately with the width cut.

One of the objects of this invention is to provide a cut-off tool having characteristics that will enable a tool of relatively small thickness, to be employed, the general object being to overcome the disadvantages of an ordinary cut-off tool outlined above.

A further object of the invention is to provide a cut-off tool assembly in which the cutting element is in the form of a relatively thin blade so constructed and supported that the only stress developed in the plate is a tensile stress, and so that no compression occurs in the blade back of the cutting point. This insures that the blade cannot buckle; and insures that the blade will be maintained in its proper plane, that is, the plane in which the stress acts.

Another object of the invention is to provide improved means for supporting a blade type of cut-off tool on the usual tool post of a lathe of common type, employing a slide for supporting the tool post; and to provide means for effectively supporting the cut-off blade, and at the same time providing for adjusting the blade so as to enable the cutting edge or tooth of the blade to be nicely adjusted with respect to the level of the axis of rotation of the work or work-piece.

Further objects of the invention will appear hereinafter.

The invention consists in the novel parts and combinations of parts to be described hereinafter, all of which contribute to produce an efficient cut-off tool assembly.

A preferred embodiment of the invention is described in the following specification, while the broad scope of the invention is pointed out in the appended claims.

In the drawing:

Fig. 1 is a side elevation of a cut-off tool assembly embodying my invention, and indicating the shape and location of a round bar which the cutting tool is operating to cut off.

Fig. 2 is a plan view of an assembly such as shown in Fig. 1, that is to say, it shows the bracket arm that supports the assembly at the tool post, broken away, but it shows another embodiment of the invention as regards the manner of anchoring the ends of the blade.

Fig. 3 is a side elevation of the parts illustrated in Fig. 2, including the entire bracket arm.

Fig. 3a is a fragmentary side elevation of the lower end portion of the blade illustrated in Fig. 3.

Fig. 4 is a plan of another embodiment of the invention, and involves the use of a thin blade substantially of quadrant form, and a holder or supporting means for the same, that is adapted to this type of cut-off blade rather than the elongated type of blade illustrated in Figs. 1 and 3.

Fig. 5 is a cross-section taken about on the line 5—5 of Fig. 6, particularly illustrating the features of construction that I may employ to secure the rear edge of this quadrant form type of blade at its rear edge.

Fig. 6 is a side elevation of this quadrant form type of assembly, certain parts being broken away so as to show portions of certain elements in cross-section.

Fig. 6a is a side elevation of a quadrant type of blade representing the same as removed from the quadrant type support or holder that is adapted to carry such a blade. This view is on a reduced scale as compared with Fig. 6.

Referring more particularly to the parts and especially to Figs. 1 to 3, inclusive, 1 indicates a slide such as usually forms a part of a lathe carriage indicated in dotted lines at 2. Below this slide its guide 3 is illustrated, the normal position of which is such that the dovetail 4 of the guide, extends parallel with the axis 5 about which the work-piece indicated by the dotted outline 6, would rotate.

On the upper side of the sleeve 1, a tool post 7 of the usual type is provided, mounted in its usual circular collar 8.

In accordance with my invention as illustrated in Figs. 1 to 3, I provide a cut-off tool 9 which is in the form of an elongated blade of relatively thin tool steel. This thickness can be as small as $\frac{3}{32}$ of an inch if desired. The forward edge 10 of this blade that is disposed toward the workpiece 6, is provided with a cutting edge or tooth 13 that is inclined slightly in an upward direction so as to present a cutting face 12 that is slightly inclined upwardly with respect to a horizontal line, and from the cutting edge 13 the forward edge 14 of this tooth is relieved along a line slightly inclined from the vertical, substantially as indicated in Fig. 1. However, the features of this cutting tooth of course, would be adapted to special requirements involving the character of the material that is to be cut off, and the permissible cutting speed with such material. The edge portion 15 immediately back of the tooth with respect to its direction of advance through the work is also considerably relieved by forming a concave edge 16 extending back from the cutting edge 13. This provides clearance to assist in getting rid of the chips or cuttings as they pass from the cutting edge.

In accordance with my invention, I provide means for suspending the tool that carries the cutting edge from a point located at a higher level than that of the cutting edge 13. At least this is the procedure in adapting the invention to use on an ordinary lathe. In this way the resistance to the operation of forming the cut, develops a downward stress acting on the tooth 11, which develops a tensile force acting downwardly in the blade, which force is of course resisted by the means employed for supporting the blade from above. In accordance with my invention, this stress is resisted from above with sufficient force to prevent any substantial compression force being developed at the lower end of the blade that could cause buckling in the blade. In order to accomplish this, I avoid making any connection to the blade below the cutting point that could offer any substantial resistance to lengthening of the blade, that is, to develop a compression force between the lower end of the blade and the cutting point, sufficient to cause buckling of the blade.

In the construction illustrated in Fig. 1, I provide a tool holder 17 in the form of an arcuate bracket which presents attaching means such as a bolt 18 for securing the upper end of the blade; and in addition to this, I provide the tool holder with a connection or attachment at a lower point on the blade below the cutting tooth, which operates as a lateral steadying connection for the blade to resist any forces tending to move the blade toward or away from the work. In the illustration, in order to meet these requirements, I prefer to give the tool holder 17 the form of yoke or similar part that presents two forks; 17a which is the upper fork, and a fork 17b which is the lower fork, the former of which carries the bolt 18 passing through an eye in the upper end of the blade to secure it in position. As illustrated in Fig. 1, the ends of the forks may be formed with slots 19 just wide enough to receive the corresponding ends of the blade 9. Instead of providing an eye for the bottom bolt 20 that I employ at the lower end of the blade, I prefer to provide a slot form socket such as that illustrated in Fig. 3a, that extends up into the lower end of the blade. This socket may fit closely to the sides of bolt 20, but there should be sufficient clearance above the bolt to allow for increase in length of the blade when it becomes hot in the cut. Of course, the side edges of the socket resting against the bolt will brace it laterally, that is, it will operate to prevent the lower portion of the blade from moving toward or away from the work. The preferred form of this socket or guide is illustrated in detail in Fig. 3a that should be read in connection with Fig. 3.

The yoke 17 is preferably supported from the tool post 7 by means of an adjustable connection that will permit the yoke and the blade 9 with it, to be adjusted up or down so as to bring the cutting point or edge 13 to substantially the height of the axis 5 of the work. This adjustment is desirable in order to adjust the cutting point accurately regardless of whether it has been considerably sharpened or re-dressed.

In order to support the yoke 17 and provide for this adjustment, I employ a bracket arm 21, the inner end 22 of which has the form and dimensions of an ordinary cutting tool as would be used in a lathe, and adapted to be secured in the tool post 7. However, in mounting the shank 22 of this bracket arm in the tool post, the usual transverse socket 23 of the tool post is disposed so that its axis extends in an inclined direction. This will dispose the body of the bracket arm along an inclined line as shown in Fig. 2. When the bracket arm is clamped up by means of the usual clamping screw 24 to hold the arm rigidly in position, the gooseneck or bent end 25 of the bracket arm should extend at right angles to the axis 5 of the work-piece. (See Fig. 2.)

It may be said in passing that this bracket arm 21 has the same construction in Fig. 1 as in Figs. 2 and 3.

In order to hold the yoke 17 rigidly in position, the end 25 of the bracket is provided on its side with a tongue 26, which tongue is disposed in a vertical direction, and this tongue fits into a groove 27 of corresponding cross-section on the adjacent face of the bracket end. The side faces of the tongue or rib 26 and the channel or groove 27, are preferably slightly tapered as indicated. These two parts are clamped together in any vertical adjusted position for the yoke, by means of a machine bolt 28 with a bolt head 29 that can be rotated forcibly by means of a wrench.

If desired, the bolt may be mounted in a vertical slot 30 in the bracket end 25; and the inner end of the nut may seat upon a washer 31 of sufficient diameter to bridge this slot 30.

Instead of slotting the ends of the forks 17a and 17b, I may provide means for clamping the end of the blade against the side of each of the forks. This is illustrated in Fig. 2 which illustrates the use of a side plate 32 that is riveted to the side face of the yoke through a spacer plate 33 by means of two or more rivets such as the rivets 34. The spacer plate 33 has substantially the same thickness as the blade 9a which fits into the slot 35 that lies between the side plate 32 and the adjacent face of the yoke. A bolt 36 is mounted in the upper fork 17a and passes through the eye in the blade at this point. This bolt is illustrated as having a countersunk head 37. In other respects the features of construction illustrated in Fig. 3 are the same as those illustrated in Fig. 1. In Fig. 3a the lower end of the blade 9a is illustrated, provided with a socket 38 that extends up into the blade from its lower end, and this socket presents a half round upper edge which fits with clearance above the upper side of the anchor bolt 21 shown in Fig. 3. This, of course, prevents the blade 9a from moving toward or away from the work, but does not prevent extension of length of blade if it becomes heated in the cut.

In the embodiment of the invention illustrated in Figs. 4 to 6, inclusive, I provide a blade 39 which is not an elongated blade such as shown in Figs. 1 and 2, but has substantially the form of a quadrant as illustrated. The forward edge 40 of this blade is provided adjacent its upper end with means for resisting a downward pull or downwardly acting force at the cutting edge 41. In the present instance, this quadrant-shaped blade has an arcuate rear edge 42.

In accordance with my invention, I provide means for securing the rear edge 42 of the blade to a tool holder 43, and in this case the yoke is in a form of an arcuate bracket, and I provide means for securing the edge 42 to the forward side or edge of the tool holder 43, and in order to accomplish this, I prefer to form the forward edge of the tool holder 43 with a groove 44 into which the rear edge 42 of the blade may be received, as illustrated in Fig. 5. After the edge 42 is put in place, I insert an arcuate-shaped filler 45 which substantially fills this channel or groove 44. In addition to this, I provide clamping means or other means for securing the blade edge in position. For this purpose I prefer to provide a plurality of threaded sockets 46 to receive Allen screws 47 that may be inserted in these sockets 46 that are located on the same side of the tool holder or supporting means 43. When these Allen screws are tightened up, they clamp the filler 45 securely against the blade edge 42 and press it forcibly against the opposite side face of the channel or groove 44. This groove may have a half round inner face as illustrated in Fig. 5, in cross-section.

I prefer to provide these threaded sockets 46 on both sides of the supporting means 43 so as to enable the blade 39 to be mounted toward either of the side faces of the supporting means.

In order to provide means for anchoring the upper edge or upper portion of the blade so as to resist the cutting forces acting at the cutting edge 41, I prefer to provide a shoulder 48 that projects forwardly adjacent to the arcuate periphery of the blade. This shoulder is preferably the lower edge of a tooth-like projection 49 that projects forwardly beyond the adjacent vertical end face 50 of the supporting means 43. Against the face 50 a keeper 51 is secured by means of a clamping bolt 52 received in a threaded socket 53 in the face 50. This end face 50 is the bottom of a channel cut back into the real end face 54 of the supporting means 43. The upper face of the supporting means 43 above the face 50, is cut away to form a notch 55, and the adjacent portion of the keeper 51 is formed with a shoulder 56 that projects over the bottom face of this notch where it intersects the countersunk face 59 which operates as a seat for the keeper 51. This shoulder 56 operates to resist the downward pull of the shoulder 48 on the keeper, and relieves the bolt 52 of shearing strains.

The arc of the groove 44 is struck on a suitable radius that would have its center located approximately in the vicinity of the cutting edge 13 or 41 of the blade. In order to enable this supporting means 43 to be mounted on either side of the bracket arm 21 to which it is attachable like the yoke 17, the rear portion of this part is provided with a vertical channel 57 on each of its side faces, and at the bottoms of these channels a threaded eye 58 is provided to receive a clamping stud or bolt similar to the bolt 28 illustrated in Fig. 2.

It will be evident that the portion 59 of the rear edge of the blade 39 which is secured near the bottom face of the supporting means 43, operates as a steadying connection for preventing the lower portion of the blade from moving toward or away from the work that is being cut into by the cutting edge of tooth 41. This cutting edge 41a inclines upwardly toward the tip of the tooth. Hence the force developed in the blade by the resistance to the cup is a tensile force as illustrated by the force line 41b in Figure 1.

The cutting tooth at the cutting edges 13 and 41, may be swaged to slightly greater width than the body of the cutting blade. This insures that the blade will run free in the cut. After the cut has appreciable depth, the side faces of the cut of course assist in guiding the blade through the work-piece.

When this cut-off tool assembly is used on other types of lathes or machine tools, the bracket-arm will be adapted to meet any special requirements.

As illustrated in the present drawing, the cutter support can be clamped up for a "right" or "left" operation.

When the cut is being made, the bight 16 and the adjacent edge 15 operate effectively to break off the chips and clear them from the cut.

It will be evident from an inspection of the direction of the force line 41b in Figure 1 that this force develops a tensile force in the blade which is resisted solely by the bolt 18 at the upper end of the blade. As the cutting face 12 inclines upwardly slightly towards its tip or edge 13 there will be a horizontal component of this force acting in an outward direction from the blade and toward the work piece. This force, however, is very slight and does not pull the blade further into the work because it is prevented from doing so by the left edge of the slot 38 that engages against the pin 20 or bolt that lies in the slot and which is located at the lower extremity of the lower fork of the tool holder 17. So, there is no compressive force developed in the lower portion of the blade. This is because the upper edge of the slot 38 is free and clear of the upper side of the bolt 21a; and this bolt is not clamped tight, thereby leaving the developed tensile force as the only force acting longitudinally in the blade.

Likewise the action of the resistance to the cut being made by the tool is the same as just described, for the quadrant shaped blade 39. (Shown in Figure 6.) There is no connection whatever at the lower edge of the blade 39 in line with the cutting tooth 41. The horizontal component of the tensile force developed at the tooth 41 is in an outward direction, toward the work piece and is merely a slight horizontal tensile force resisted by the bolts 46 that clamp up the convex rear edge of the blade 39.

Many other embodiments of the invention may be resorted to without departing from the spirit of the invention.

I claim as my invention:

1. A cut-off tool assembly for cutting through a rotating work-piece, comprising the combination of a blade having an elongated front edge with a cutting-tooth projecting from said edge intermediate the length thereof, said tooth including a cutting face and a relief surface constituting a portion of said front edge, yoke means connected to and fixedly supporting said blade adjacent one end thereof so that the resistance to the cutting operation exerts tension in the blade between the tooth and said fixedly supported end, and means for guiding the blade at the other end portion thereof to permit free extension of the blade in line with the tensile force, said guide means including parts engaging the lateral faces of the blade for preventing lateral movement thereof.

2. A cut-off tool assembly according to claim 1 in which the blade is of elongated strap form, a bolt connecting its upper end to the upper end of the yoke, and a bolt-and-slot connection between the blade and the lower end of the yoke, with the slot extending longitudinally with the blade, the bolt of said bolt-and-slot connection being out of contact with the end of said slot to prevent the development of a compressive force in alignment with the said force line, thereby preventing buckling in the portion of said blade adjacent thereto.

3. In a cut-off tool assembly for cutting through a work-piece rotating on its own longitudinal axis, the combination of a blade with a medially positioned cutting tooth on its forward edge to engage and cut through the work-piece, a yoke having forks disposed in a plane extending substantially perpendicular to said axis, with said forks supporting the end portions of the blade in a plane also extending substantially at right angles to the axis of rotation of the work-piece, a bracket-arm supported in a fixed position, said bracket-arm and said yoke at its middle portion having a groove and a tongue respectively fitting together to form a continuous clamping connection between the bracket arm and the yoke to enable the said blade and cutting tooth to be adjusted up or down with respect to the axis of rotation of the work-piece, said clamping connection including a clamping bolt for clamping the yoke to the bracket arm in any adjusted position.

4. A cut-off tool assembly for cutting through a rotating work-piece, comprising the combination of a blade having an elongated front edge with a cutting-tooth projecting from said edge intermediate the length thereof, said tooth including a cutting face and a relief surface constituting a portion of said front edge, means for supporting said blade adjacent one end thereof so that the resistance to the cutting operation exerts tension in the blade between the tooth and said supported end; said supporting means being of arcuate form providing a concave forward side, and said blade having a rear convex edge engaging and fitting to said concave forward side of the supporting means to steady the end portion of said blade lying remote from said supporting means against movement toward or from the work-piece.

5. A cut-off tool assembly for cutting through a rotating work-piece, according to claim 4, in which the said concave forward side of the supporting means has a channel formed thereon and said blade has a rear convex edge received in said channel; an arcuate filler in said channel covering the edge of said blade said frictional clamping means functioning to force the said filler against the blade to clamp the same against the side of said channel.

6. In a cut-off tool assembly for cutting through a work-piece mounted for rotation on its own longitudinal horizontal axis, the combination of a blade of substantially quadrant form having a convex rear edge and a cutting tooth on its forward edge, supporting means for said blade having a concave side to receive said convex rear edge, means for securing the convex rear edge of the blade to said concave side, said supporting means having an upper portion above the level of the tooth and substantially in vertical alignment with the same, said blade having a shoulder at its upper portion adjacent said upper portion of said supporting means, and a detachable keeper secured to said upper portion of the supporting means and engaging under said shoulder to resist the force developed in said blade by the tooth when cutting through the work-piece.

7. In a cut-off tool assembly, the combination of an arcuate blade-holder disposed in a substantially vertical plane, a blade connected to the upper end of said blade holder and having a cutting tooth on its forward edge projecting away from the holder and with the cutting face of the tooth inclining upwardly toward its tip, said holder having a guide groove on its side face extending substantially parallel with the forward edge of said blade for mounting the same on a fixed support, and means adjacent the lower end of the blade holder for preventing forward movement or rearward movement of the blade relative to the holder while permitting free extension of the blade at that end.

References Cited in the file of this patent

UNITED STATES PATENTS

| Number | Name | Date |
| --- | --- | --- |
| 1,855,971 | Kilmen | Apr. 26, 1932 |
| 2,419,081 | Messenger | Apr. 15, 1947 |

FOREIGN PATENTS

| Number | Country | Date |
| --- | --- | --- |
| 1,442 | Great Britain | Aug. 26, 1915 |
| 143,388 | Great Britain | May 27, 1920 |